(12) United States Patent
Fukushima et al.

(10) Patent No.: US 11,024,334 B2
(45) Date of Patent: Jun. 1, 2021

(54) HIGH DENSITY MAGNETIC RECORDING MEDIUM FOR HEAT-ASSISTED MAGNETIC STORAGE APPARATUS

(71) Applicant: SHOWA DENKO K.K., Tokyo (JP)

(72) Inventors: Takayuki Fukushima, Chiba (JP); Chen Xu, Chiba (JP); Lei Zhang, Chiba (JP); Hisato Shibata, Chiba (JP); Takehiro Yamaguchi, Chiba (JP); Kazuya Niwa, Chiba (JP); Tomoo Shige, Chiba (JP); Hiroaki Nemoto, Chiba (JP); Yuji Umemoto, Chiba (JP); Hiroshi Koyanagi, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/835,770

(22) Filed: Mar. 31, 2020

(65) Prior Publication Data

US 2020/0327905 A1    Oct. 15, 2020

(30) Foreign Application Priority Data

Apr. 9, 2019    (JP) .............................. JP2019-074315

(51) Int. Cl.
| | | |
|---|---|---|
| *G11B 11/105* | (2006.01) | |
| *G11B 5/65* | (2006.01) | |
| *G11B 5/66* | (2006.01) | |
| *G11B 5/60* | (2006.01) | |
| *G11B 5/00* | (2006.01) | |

(52) U.S. Cl.
CPC ............ *G11B 5/653* (2013.01); *G11B 5/6088* (2013.01); *G11B 5/66* (2013.01); *G11B 2005/0021* (2013.01); *G11B 2005/0024* (2013.01); *G11B 2005/0029* (2013.01)

(58) Field of Classification Search
None
See application file for complete search history.

(56) References Cited

U.S. PATENT DOCUMENTS

| | | | |
|---|---|---|---|
| 8,003,163 B2 * | 8/2011 | Lee .......................... | G11B 5/82 427/128 |
| 9,689,065 B2 | 6/2017 | Chen et al. | |
| 10,614,849 B2 * | 4/2020 | Fukushima ........ | G11B 5/73917 |

(Continued)

FOREIGN PATENT DOCUMENTS

| | | |
|---|---|---|
| JP | 2015-130223 | 7/2015 |
| JP | 2016-026368 | 2/2016 |
| JP | 2017-182861 | 10/2017 |

OTHER PUBLICATIONS

K. F. Dong, et al., L10 FePt—ZrO2 (001) nanostructured films with high aspect ratio columnar grains, Applied Physics Letters 104, 192404 (2014), pp. 192404-1-192404-5.

*Primary Examiner* — Tan X Dinh
(74) *Attorney, Agent, or Firm* — IPUSA, PLLC (57) ABSTRACT

A magnetic recording medium includes a substrate, an underlayer, and a magnetic layer that are arranged in this order. The magnetic layer has a granular structure including magnetic grains having a $L1_0$ crystal structure, and grain boundary parts having a volume fraction in a range of 25 volume % to 50 volume %. The magnetic grains have a c-axis orientation with respect to the substrate. The grain boundary parts include a material having a lattice constant in a range of 0.30 nm to 0.36 nm, or in a range of 0.60 nm to 0.72 nm.

17 Claims, 4 Drawing Sheets

(56) References Cited

U.S. PATENT DOCUMENTS

| | | | |
|---|---|---|---|
| 2010/0165510 A1* | 7/2010 | Takahashi | G11B 5/66 360/135 |
| 2011/0205862 A1* | 8/2011 | Kanbe | G11B 5/65 369/13.32 |
| 2012/0052330 A1* | 3/2012 | Takekuma | G11B 5/84 428/829 |
| 2012/0307398 A1* | 12/2012 | Kanbe | G11B 5/65 360/75 |
| 2014/0093748 A1* | 4/2014 | Chen | G11B 5/7369 428/831 |
| 2014/0376127 A1* | 12/2014 | Kanbe | G11B 5/66 360/110 |
| 2015/0036242 A1* | 2/2015 | Zhang | G11B 5/737 360/135 |
| 2015/0049594 A1* | 2/2015 | Kanbe | G11B 5/737 369/13.24 |
| 2015/0085628 A1* | 3/2015 | Niwa | G11B 11/10589 369/13.11 |

* cited by examiner

| | Second Magnetic Layer | | Coercivity Hc [kOe] | Ordering Degree S |
|---|---|---|---|---|
| | Composition | Ion Crystal & Crystal Orientation Thereof Included in Grain Boundary Part | | |
| EI1 | (Fe-49at%Pt)-6.8vol%C-20.8vol%SnO$_2$-13.3vol%BN | SnO$_2$(110) | 31.72 | 0.76 |
| EI2 | (Fe-49at%Pt)-6.8vol%C-20.8vol%OsO$_2$-13.3vol%BN | OsO$_2$(110) | 30.73 | 0.75 |
| EI3 | (Fe-49at%Pt)-6.8vol%C-20.8vol%IrO$_2$-13.3vol%BN | IrO$_2$(110) | 30.73 | 0.75 |
| EI4 | (Fe-49at%Pt)-6.8vol%C-20.8vol%VO$_2$-13.3vol%BN | VO$_2$(110) | 30.75 | 0.75 |
| EI5 | (Fe-49at%Pt)-6.8vol%C-20.8vol%MnO$_2$-13.3vol%BN | MnO$_2$(110) | 30.55 | 0.75 |
| EI6 | (Fe-49at%Pt)-6.8vol%C-20.8vol%RuO$_2$-13.3vol%BN | RuO$_2$(110) | 33.15 | 0.76 |
| EI7 | (Fe-49at%Pt)-6.8vol%C-20.8vol%GeO$_2$-13.3vol%BN | GeO$_2$(110) | 28.05 | 0.75 |
| EI8 | (Fe-49at%Pt)-6.8vol%C-20.8vol%NbO$_2$-13.3vol%BN | NbO$_2$(110) | 29.82 | 0.75 |
| EI9 | (Fe-49at%Pt)-6.8vol%C-20.8vol%TiO$_2$-13.3vol%BN | TiO$_2$(110) | 29.58 | 0.75 |
| EI10 | (Fe-49at%Pt)-6.8vol%C-20.8vol%MgF$_2$-13.3vol%BN | MgF$_2$(110) | 29.13 | 0.75 |
| EI11 | (Fe-49at%Pt)-6.8vol%C-20.8vol%MgF$_2$-13.3vol%BN | NiF$_2$(110) | 27.63 | 0.74 |
| EI12 | (Fe-49at%Pt)-6.8vol%C-20.8vol%HfO$_2$-13.3vol%BN | CoF$_2$(110) | 28.10 | 0.75 |
| EI13 | (Fe-49at%Pt)-6.8vol%C-20.8vol%PbO$_2$-13.3vol%BN | FeF$_2$(110) | 28.64 | 0.75 |
| EI14 | (Fe-49at%Pt)-6.8vol%C-20.8vol%MnF$_2$-13.3vol%BN | MnF$_2$(110) | 28.71 | 0.74 |
| EI15 | (Fe-49at%Pt)-6.8vol%C-20.8vol%ZnF$_2$-13.3vol%BN | ZnF$_2$(110) | 28.30 | 0.74 |
| EI16 | (Fe-49at%Pt)-6.8vol%C-20.8vol%SnO$_2$-13.3vol%BN | SnO$_2$(001) | 32.11 | 0.76 |
| EI17 | (Fe-49at%Pt)-6.8vol%C-20.8vol%OsO$_2$-13.3vol%BN | NbO$_2$(001) | 30.09 | 0.75 |
| EI18 | (Fe-49at%Pt)-6.8vol%C-20.8vol%OsO$_2$-13.3vol%BN | OsO$_2$(001) | 30.75 | 0.75 |
| EI19 | (Fe-49at%Pt)-6.8vol%C-20.8vol%IrO$_2$-13.3vol%BN | IrO$_2$(001) | 30.69 | 0.75 |
| EI20 | (Fe-49at%Pt)-6.8vol%C-20.8vol%RuO$_2$-13.3vol%BN | RuO$_2$(001) | 30.53 | 0.75 |
| EI21 | (Fe-49at%Pt)-6.8vol%C-20.8vol%CoF$_2$-13.3vol%BN | CoF$_2$(001) | 29.73 | 0.75 |
| EI22 | (Fe-49at%Pt)-6.8vol%C-20.8vol%FeF$_2$-13.3vol%BN | FeF$_2$(001) | 29.59 | 0.75 |
| EI23 | (Fe-49at%Pt)-6.8vol%C-20.8vol%NiF$_2$-13.3vol%BN | NiF$_2$(001) | 29.41 | 0.75 |
| EI24 | (Fe-49at%Pt)-6.8vol%C-20.8vol%ZnF$_2$-13.3vol%BN | ZnF$_2$(001) | 29.62 | 0.75 |
| EI25 | (Fe-49at%Pt)-6.8vol%C-20.8vol%MgF$_2$-13.3vol%BN | MgF$_2$(001) | 28.00 | 0.75 |
| EI26 | (Fe-49at%Pt)-6.8vol%C-20.8vol%MnF$_2$-13.3vol%BN | MnF$_2$(001) | 29.56 | 0.75 |
| EI27 | (Fe-49at%Pt)-6.8vol%C-20.8vol%PbTe-13.3vol%BN | PbTe(001) | 30.74 | 0.75 |
| EI28 | (Fe-49at%Pt)-6.8vol%C-20.8vol%SnTe-13.3vol%BN | SnTe(001) | 29.46 | 0.75 |
| EI29 | (Fe-49at%Pt)-6.8vol%C-20.8vol%KCl-13.3vol%BN | KCl(001) | 28.55 | 0.75 |
| EI30 | (Fe-49at%Pt)-6.8vol%C-20.8vol%KBr-13.3vol%BN | KBr(001) | 29.42 | 0.75 |
| EI31 | (Fe-49at%Pt)-6.8vol%C-20.8vol%KI-13.3vol%BN | KI(001) | 27.53 | 0.75 |
| EI32 | (Fe-49at%Pt)-6.8vol%C-20.8vol%InSb-13.3vol%BN | InSb(001) | 26.77 | 0.74 |
| EI33 | (Fe-49at%Pt)-6.8vol%C-20.8vol%NaI-13.3vol%BN | NaI(001) | 26.21 | 0.74 |
| CE1 | (Fe-49at%Pt)-6.8vol%C-20.8vol%SiO$_2$-13.3vol%BN | Amorphous | 25.45 | 0.68 |
| CE2 | (Fe-49at%Pt)-6.8vol%C-20.8vol%ZrO$_2$-13.3vol%BN | ZrO$_2$(001) | 23.12 | 0.68 |
| CE3 | (Fe-49at%Pt)-6.8vol%C-20.8vol%WO$_3$-13.3vol%BN | Amorphous | 22.54 | 0.67 |
| CE4 | (Fe-49at%Pt)-6.8vol%C-20.8vol%Ta$_2$O$_5$-13.3vol%BN | Amorphous | 24.04 | 0.67 |

FIG.5

| | Fourth Underlayer | | | | | Coercivity Hc [kOe] | Ordering Degree S |
|---|---|---|---|---|---|---|---|
| | Composition | NaCl Type Oxide | NaCl Type Nitride | Rutile Type Oxide | Rutile Type Fluoride | | |
| EI1 | MgO | MgO | – | – | – | 31.72 | 0.76 |
| EI34 | TiN | – | TiN | – | – | 27.33 | 0.76 |
| EI35 | TiN-25vol%$TiO_2$ | – | TiN | $TiO_2$ | – | 31.45 | 0.76 |
| EI36 | TiN-25vol%$SnO_2$ | – | TiN | $SnO_2$ | – | 33.58 | 0.76 |
| EI37 | TiN-25vol%$MnO_2$ | – | TiN | $MnO_2$ | – | 32.41 | 0.76 |
| EI38 | TiN-25vol%$VO_2$ | – | TiN | $VO_2$ | – | 32.62 | 0.76 |
| EI39 | TiN-25vol%$RuO_2$ | – | TiN | $RuO_2$ | – | 35.02 | 0.76 |
| EI40 | TiN-25vol%$GeO_2$ | – | TiN | $GeO_2$ | – | 29.92 | 0.76 |
| EI41 | TiN-25vol%$NbO_2$ | – | TiN | $NbO_2$ | – | 31.69 | 0.76 |
| EI42 | TiN-25vol%$HfO_2$ | – | TiN | $HfO_2$ | – | 30.55 | 0.76 |
| EI43 | MgO-25vol%$MgF_2$ | MgO | – | – | $MgF_2$ | 29.45 | 0.76 |
| EI44 | MgO-25vol%$NiF_2$ | MgO | – | – | $NiF_2$ | 27.95 | 0.76 |
| EI45 | MgO-25vol%$CoF_2$ | MgO | – | – | $CoF_2$ | 26.92 | 0.76 |
| EI46 | MgO-25vol%$FeF_2$ | MgO | – | – | $FeF_2$ | 26.43 | 0.76 |
| EI47 | MgO-25vol%$MnF_2$ | MgO | – | – | $MnF_2$ | 26.01 | 0.76 |
| EI48 | MgO-25vol%$ZnF_2$ | MgO | – | – | $ZnF_2$ | 25.18 | 0.76 | ium, and a magnetic storage apparatus including the
magnetic recording medium.

HIGH DENSITY MAGNETIC RECORDING MEDIUM FOR HEAT-ASSISTED MAGNETIC STORAGE APPARATUS

CROSS-REFERENCE TO RELATED APPLICATIONS

This application is based upon and claims priority to Japanese Patent Application No. 2019-074315 filed on Apr. 9, 2019, the entire contents of which are incorporated herein by reference.

BACKGROUND OF THE INVENTION

1. Field of the Invention

The present invention relates to a magnetic recording medium, and a magnetic storage apparatus including the magnetic recording medium.

2. Description of the Related Art

Recently, the heat assisted magnetic recording (HAMR) is considered to be one of promising next-generation recording methods for further improving the surface recording density of the magnetic recording media to approximately 2 Tbit/inch$^2$, for example. In the HAMR, the surface of the magnetic recording medium is locally heated by irradiating near-field light or microwave thereon, to locally reduce the coercivity of the magnetic recording medium and assist the recording of information. The HAMR that applies the microwave on the magnetic recording medium is sometimes also referred to as microwave HAMR. When a magnetic head for the HAMR is used, it is possible to easily record the information on the magnetic recording medium having a coercivity of several tens of kOe at room temperature. For this reason, when employing the HAMR, magnetic grains forming a magnetic layer of the magnetic recording medium may be made of a high-Ku material, where Ku denotes a magnetic anisotropy constant. As a result, it is possible to reduce the magnetic grain size, while maintaining thermal stability.

Examples of such high-Ku materials include Fe—Pt alloys having a Ku of approximately $7\times10^6$ J/m$^3$, Co—Pt alloys having a Ku of approximately $5\times10^6$ J/m$^3$, or the like, having a L1$_0$ crystal structure.

As materials forming grain boundary parts of magnetic grains, various nonmagnetic materials are known from Japanese Laid-Open Patent Publications No. 2016-26368, No. 2017-182861, and No. 2015-130223, and K. F. Dong et al., "L1$_0$ FePt—ZrO$_2$ (001) nanostructured films with high aspect ratio columnar grains", Applied Physics Letters 104, 192404 (2014), for example.

However, there are continued demands to further improve the surface recording density of magnetic recording media.

SUMMARY OF THE INVENTION

One object of the embodiments of the present invention is to provide a magnetic recording medium and a magnetic storage apparatus, which can provide a high surface recording density.

A more specific object of the embodiments of the present invention is to provide a magnetic recording medium having a high coercivity, and form a magnetic layer of the magnetic recording medium by magnetic grains made of a high-Ku material, to achieve a high surface recording density.

According to one aspect of the embodiments of the present invention, a magnetic recording medium includes a substrate, an underlayer disposed above the substrate, and a magnetic layer disposed above the underlayer, wherein the magnetic layer has a granular structure including magnetic grains having a L1$_0$ crystal structure, and grain boundary parts having a volume fraction in a range of 25 volume % to 50 volume %, wherein the magnetic grains have a c-axis orientation with respect to the substrate, and wherein the grain boundary parts include a material having a lattice constant in a range of 0.30 nm to 0.36 nm, or in a range of 0.60 nm to 0.72 nm.

According to another aspect of the embodiments of the present invention, a magnetic storage apparatus includes the magnetic recording medium referred above; and a magnetic head configured to write information to and read information from the magnetic recording medium.

Other objects and further features of the present invention will be apparent from the following detailed description when read in conjunction with the accompanying drawings.

BRIEF DESCRIPTION OF THE DRAWINGS

FIG. 4 is a diagram illustrating evaluation results of a coercivity Hc, and an ordering degree S of magnetic grains forming a second magnetic layer of magnetic recording media.

DESCRIPTION OF THE PREFERRED EMBODIMENTS

Embodiments and exemplary implementations of a magnetic recording medium and a magnetic storage apparatus according to the present invention will be described, by referring to the drawings. In each of the embodiments, the configuration, arrangements or positions, materials, and amounts (volume %) of elements used in the magnetic recording medium or the magnetic storage apparatus may be appropriately modified, unless indicated otherwise. Further, the drawings are not drawn to scale, and for the sake of convenience, constituent elements may be illustrated on an enlarged scale to facilitate the understanding.

[1] A magnetic recording medium according to one embodiment may include a substrate, an underlayer disposed above the substrate, and a magnetic layer disposed above the underlayer, wherein the magnetic layer has a granular structure including magnetic grains having a L1$_0$ crystal structure, and grain boundary parts having a volume fraction in a range of 25 volume % to 50 volume %, wherein the magnetic grains have a c-axis orientation with respect to the substrate, and wherein the grain boundary parts include a material having a lattice constant in a range of 0.30 nm to 0.36 nm, or in a range of 0.60 nm to 0.72 nm.

[2] In the magnetic recording medium of [1] above, the material included in the grain boundary parts may be a crystalline material that is perpendicularly oriented with respect to the substrate, and the lattice constant may be that of an axis perpendicularly oriented with respect to the substrate.

[3] In the magnetic recording medium of [2] above, the crystalline material may be an ionic crystal selected from a group consisting of $SnO_2$, $OsO_2$, $IrO_2$, $VO_2$, $MnO_2$, $TiO_2$, $RuO_2$, $GeO_2$, $NbO_2$, $MgF_2$, $NiF_2$, $CoF_2$, $FeF_2$, $MnF_2$, $ZnF_2$, PbTe, SnTe, KCl, KBr, KI, InSb, and NaI.

[4] In the magnetic recording medium of [3] above, the grain boundary parts may further include C, BN, or B, and the ionic crystal may have a volume fraction in a range of 10 volume % to 80 volume %.

[5] In the magnetic recording medium of [3] or [4] above, the ionic crystals of $SnO_2$, $OsO_2$, $IrO_2$, $VO_2$, $MnO_2$, $TiO_2$, $RuO_2$, $GeO_2$, $NbO_2$, $MgF_2$, $NiF_2$, $CoF_2$, $FeF_2$, $MnF_2$, and $ZnF_2$ may have a rutile structure in which a c-axis or a (110) axis is the axis perpendicularly oriented with respect to the substrate, and an a-axis of the ionic crystals of PbTe, SnTe, KCl, KBr, KI, InSb, and NaI may be the axis perpendicularly oriented with respect to the substrate.

[6] In the magnetic recording medium of any one of [1] to [5] above, the underlayer may include one compound selected from a group consisting of NaCl oxides, NaCl nitrides, and NaCl carbides, the NaCl oxides may include at least one of MgO, TiO, and NiO, the NaCl nitrides may include at least one of TiN, TaN, HfN, and NbN, and the NaCl carbides may include at least one of ZrC, HfC, TaC, NbC, and TiC.

[7] In the magnetic recording medium of [6] above, the underlayer may further include a rutile oxide or a rutile fluoride, and a c-axis or a (110) axis of the rutile oxide or the rutile fluoride may be perpendicularly oriented with respect to the substrate.

[8] In the magnetic recording medium of [7] above, the rutile fluoride may include one of $MgF_2$, $NiF_2$, $CoF_2$, $FeF_2$, $MnF_2$, $ZnF_2$, and $VF_2$.

[9] A magnetic storage apparatus according to one embodiment may include the magnetic recording medium of any one of [1] to [8] above; and a magnetic head configured to write information to and read information from the magnetic recording medium.

[Magnetic Recording Medium]

Figure 1:
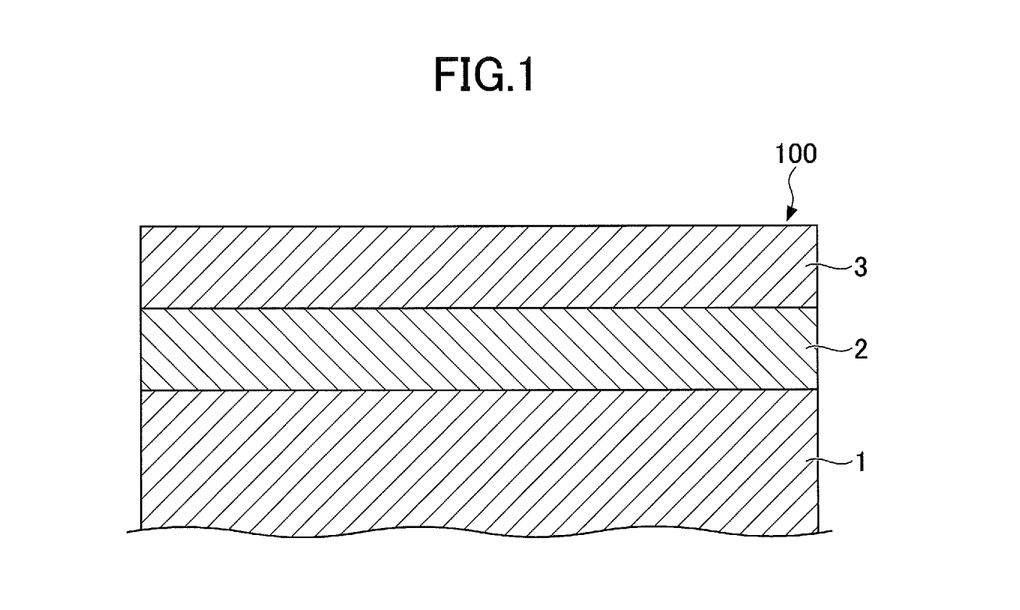
FIG. 1 is a cross sectional view illustrating an example of a layered structure of a magnetic recording medium according to one embodiment of the present invention.

FIG. 1 is a cross sectional view illustrating an example of a layered structure of a magnetic recording medium in one embodiment of the present invention. In this example, a magnetic recording medium 100 is a HAMR medium employing the HAMR.

The magnetic recording medium 100 includes a substrate 1, an underlayer 2, and a magnetic layer 3 that are arranged in this order. In other words, the underlayer 2 is disposed above the substrate 1, and the magnetic layer 3 is disposed above the underlayer 2, so that the underlayer 2 is arranged between the substrate 1 and the magnetic layer 3.

The magnetic layer 3 has a granular structure including magnetic grains having a $L1_0$ crystal structure, and grain boundary parts having a volume fraction in a range of 25 volume % to 50 volume %. The magnetic grains have a c-axis orientation with respect to the substrate 1. In other words, the magnetic grains have the c-axis orientation with respect to a surface of the substrate 1 on which the underlayer 2 is formed. The grain boundary parts include a material having a lattice constant in a range of 0.30 nm to 0.36 nm, or in a range of 0.60 nm to 0.72 nm. Hence, the magnetic recording medium 100 can be made to have a high coercivity, and the magnetic layer 3 can be formed by magnetic grains made of a high-Ku material, where Ku denotes a magnetic anisotropy constant.

Examples of the magnetic grains having a $L1_0$ crystal structure include magnetic grains made of Fe—Pt alloys, Co—Pt alloys, or the like, for example.

The volume fraction of the grain boundary parts within the magnetic layer 3 is 25 volume % to 50 volume %, and preferably 35 volume % to 45 volume %. When the volume fraction of the grain boundary parts within the magnetic layer 3 is less than 25 volume %, or exceeds 50 volume %, the coercivity of the magnetic recording medium 10 decreases, and the magnetic anisotropy constant Ku of the magnetic grains forming the magnetic layer 3 also decreases.

The c-axis orientation of the magnetic grains with respect to the substrate 1, that is, the (001) textured orientation, may be achieved by methods, such as epitaxially growing the magnetic layer 3 along the c-axis using the underlayer 2, or the like, for example. The (001) textured orientation may also be referred to as the (001) plane orientation or the (001) face orientation.

The material included in the grain boundary parts is made to have the lattice constant in the range of 0.30 nm to 0.36 nm, or in the range of 0.60 nm to 0.72 nm, in order to generate a lattice mismatch of 5% to 20% with respect to an atomic spacing of the Fe—Pt alloy grains having the c-axis orientation with respect to the substrate 1. For example, Fe and Pt in the Fe—Pt alloy grains are periodically arranged, and the atomic spacing is 0.371×n, where n is a natural number. The epitaxial growth of a material is facilitated when the atomic spacing and the lattice constant of the material match. On the other hand, when introducing lattice distortion, the lattice constant needs to be varied with respect to the atomic spacing, and the present inventors found through experimentation that a lattice mismatch of 5% to 20% is the optimum range from the viewpoint of facilitating the epitaxial growth of the material. In other words, the material included in the grain boundary parts can be grown epitaxially by setting the lattice constant of the material included in the grain boundary parts in a range of [0.371× (1−0.05)]×n to [0.371×(1−0.2)]×n while introducing the lattice distortion. When the lattice constant of the material included in the grain boundary parts is less than [0.371×(1− 0.05)]×n, the lattice mismatch becomes too large, thereby preventing the epitaxial growth of the material. On the other hand, when the lattice constant of the material included in the grain boundary parts exceeds [0.371×(1−0.2)]×n, the lattice mismatch becomes too small, thereby preventing introduction of a sufficiently large lattice distortion, and making it difficult to promote ordering of the Fe—Pt alloy grains.

The c-axis orientation with respect to the substrate 1 can be achieved for the magnetic grains made of materials other than the Fe—Pt alloys and having the $L1_0$ crystal structure, similar to the Fe—Pt alloy grains.

The material included in the grain boundary parts is preferably a crystalline material that is perpendicularly oriented with respect to the substrate 1, that is, perpendicularly oriented with respect to the surface of the substrate 1 on which the underlayer 2 is formed. In addition, the lattice constant is preferably the lattice constant of an axis perpendicularly oriented with respect to the substrate 1.

Examples of the crystalline material include single crystalline materials, polycrystalline materials, microcrystalline materials, composite crystalline materials, mixtures of such materials and amorphous materials, or the like.

Examples of the crystalline material having the axis that is perpendicularly oriented with respect to the substrate 1 and has the lattice constant in the range of 0.30 nm to 0.36 nm, and the crystal orientation of this crystalline material, include the (001) textured orientation of $SnO_2$, the (001) textured orientation of $NbO_2$, the (001) textured orientation of $OsO_2$, the (001) textured orientation of $IrO_2$, the (001) textured orientation of $RuO_2$, the (001) textured orientation of $CoF_2$, the (001) textured orientation of $FeF_2$, the (001) textured orientation of $NiF_2$, the (001) textured orientation of $ZnF_2$, the (001) textured orientation of $MgF_2$, the (001) textured orientation of $MnF_2$, or the like, for example.

In addition, examples of the crystalline material having the axis that is perpendicularly oriented with respect to the substrate 1 and has the lattice constant in the range of 0.60 nm to 0.72 nm, and the crystal orientation of this crystalline material, include the (110) textured orientation of $SnO_2$, the (110) textured orientation of $OsO_2$, the (110) textured orientation of $IrO_2$, the (110) textured orientation of $VO_2$, the (110) textured orientation of $MnO_2$, the (110) textured orientation of $RuO_2$, the (110) textured orientation of $GeO_2$, the (110) textured orientation of $NbO_2$, the (110) textured orientation of $TiO_2$, the (110) textured orientation of $MgF_2$, the (110) textured orientation of $NiF_2$, the (110) textured orientation of $CoF_2$, the (110) textured orientation of $FeF_2$, the (110) textured orientation of $MnF_2$, the (110) textured orientation of $ZnF_2$, the (001) textured orientation of PbTe, the (001) textured orientation of $SnTe_2$, the (001) textured orientation of KCl, the (001) textured orientation of KBr, the (001) textured orientation of KI, the (001) textured orientation of InSb, the (001) textured orientation of NaI, or the like, for example.

Examples of the crystalline material include ionic crystals of $SnO_2$, $OsO_2$, $IrO_2$, $VO_2$, $MnO_2$, $TiO_2$, $RuO_2$, $GeO_2$, $NbO_2$, $MgF_2$, $NiF_2$, $CoF_2$, $FeF_2$, $MnF_2$, $ZnF_2$, PbTe, SnTe, KCl, KBr, KI, InSb, NaI, or the like, for example. In addition, the crystalline material may include two or more kinds of such ionic crystals.

The ionic crystals of $SnO_2$, $OsO_2$, $IrO_2$, $VO_2$, $MnO_2$, $TiO_2$, $RuO_2$, $GeO_2$, $NbO_2$, $MgF_2$, $NiF_2$, $CoF_2$, $FeF_2$, $MnF_2$, and $ZnF_2$ preferably have a rutile structure in which a c-axis or a (110) axis is the axis perpendicularly oriented with respect to the substrate 1. In addition, an a-axis of the ionic crystals of PbTe, SnTe, KCl, KBr, KI, InSb, and NaI is preferably the axis perpendicularly oriented with respect to the substrate 1. In this case, the magnetic recording medium 100 can be made to have an even higher coercivity, and the magnetic layer 3 can be formed by the magnetic grains made of the high-Ku material having an even higher magnetic anisotropy constant Ku.

The grain boundary parts preferably further include C, BN, or B, and the ionic crystal preferably has a volume fraction in a range of 10 volume % to 80 volume %. In this case, the magnetic recording medium 100 can be made to have an even higher coercivity, and the magnetic layer 3 can be formed by the magnetic grains made of the high-Ku material having an even higher magnetic anisotropy constant Ku.

The C, BN, or B further included in the grain boundary parts is preferably amorphous (or noncrystalline).

The magnetic recording medium 100 may further include one or more magnetic layers other than the magnetic layer 3.

Examples of a material forming the underlayer 2 is not particularly limited, as long as the material enables the c-axis orientation of the magnetic grains, having the $L1_0$ crystal structure and included in the magnetic layer 3, with respect to the substrate 1.

The underlayer 2 preferably includes a compound selected from a group consisting NaCl oxides, NaCl nitrides, and NaCl carbides.

The NaCl oxides include at least one of MgO, TiO, NiO, or the like, for example. Further, the NaCl oxides may include two or more kinds of such oxides.

The NaCl nitrides include at least one of TiN, TaN, HfN, NbN, or the like, for example. Further, the NaCl nitrides may include two or more kinds of such nitrides.

The NaCl carbides include at least one of ZrC, HfC, TaC, NbC, TiC, or the like, for example. Further, the NaCl carbides may include two or more kinds of such carbides.

The underlayer 2 preferably further includes a rutile oxide or a rutile fluoride. In addition, the rutile oxide or the rutile fluoride preferably has a c-axis or a (110) axis perpendicularly oriented with respect to the substrate 1.

The rutile fluoride preferably includes one of $MgF_2$, $NiF_2$, $CoF_2$, $FeF_2$, $MnF_2$, $ZnF_2$, $VF_2$, or the like, for example. Further, the rutile fluoride may include two or more kinds of such fluorides.

The magnetic recording medium 100 may further include one or more underlayers other than the underlayer 2.

The substrate 1 may be foiled by a suitable, known substrate.

When manufacturing the magnetic recording medium 100, the substrate 1 may be heated to a temperature of 500° C. or higher, for example. For this reason, the substrate 1 may be formed by a heat-resisting glass substrate having a softening temperature of 500° C. or higher, and preferably 600° C. or higher, for example.

The magnetic recording medium 100 preferably includes a protection layer formed on the magnetic layer 3.

Examples of a material forming the protection layer include diamond-like carbon (DLC), or the like, for example.

Examples of the method of forming the protection layer include radio frequency-chemical vapor deposition (RF-CVD), ion beam deposition (IBD), filtered cathodic vacuum arc (FCVA), or the like, for example. The RF-CVD decomposes a source gas made of hydrocarbon by high-frequency plasma to deposit the protection layer. The IBD ionizes the source gas by electrons emitted from a filament to deposit the protection layer. The FCVA deposits the protection layer using a solid carbon target, without using a source gas.

The protection layer preferably has a thickness of 1 nm to 6 nm, for example. A satisfactory floating characteristic of a magnetic head is obtained when the thickness of the protection layer is 1 nm or greater, and a magnetic spacing becomes small and a signal-to-noise ratio (SNR) of the magnetic recording medium 100 improves when the thickness of the protection layer is 6 nm or less.

The magnetic recording medium 100 may further include a lubricant layer formed on the protection layer.

Examples of a lubricant forming the lubricant layer include perfluoropolyether type fluororesins or the like, for example.

Layers other than the layers described above, such as a seed layer, a bonding layer, or the like may be additionally provided in the magnetic recording medium 100, as required.

[Magnetic Storage Apparatus]

Next, an example of a structure of a magnetic storage apparatus according to one embodiment of the present invention will be described. The magnetic storage apparatus according to this embodiment is not limited to a particular structure, as long as the magnetic storage apparatus includes one or more magnetic recording media according to this embodiment.

For example, the magnetic storage apparatus according to this embodiment includes a driving mechanism that drives the magnetic recording medium to rotate in a recording direction, and a magnetic head having a near-field light generator (or near-field light generating element) provided on a tip end thereof. The magnetic head further has a laser generator that generates laser light for heating the magnetic recording medium, and a waveguide that guides the laser light generated from the laser generator to the near-field light generator. The magnetic storage apparatus further includes a head moving mechanism that moves the magnetic head, and a signal processor that processes signals that are input to the magnetic head to be recorded on the magnetic recording medium, and processes signals that are reproduced from the magnetic recording medium by the magnetic head and output from the magnetic head.

Figure 2:
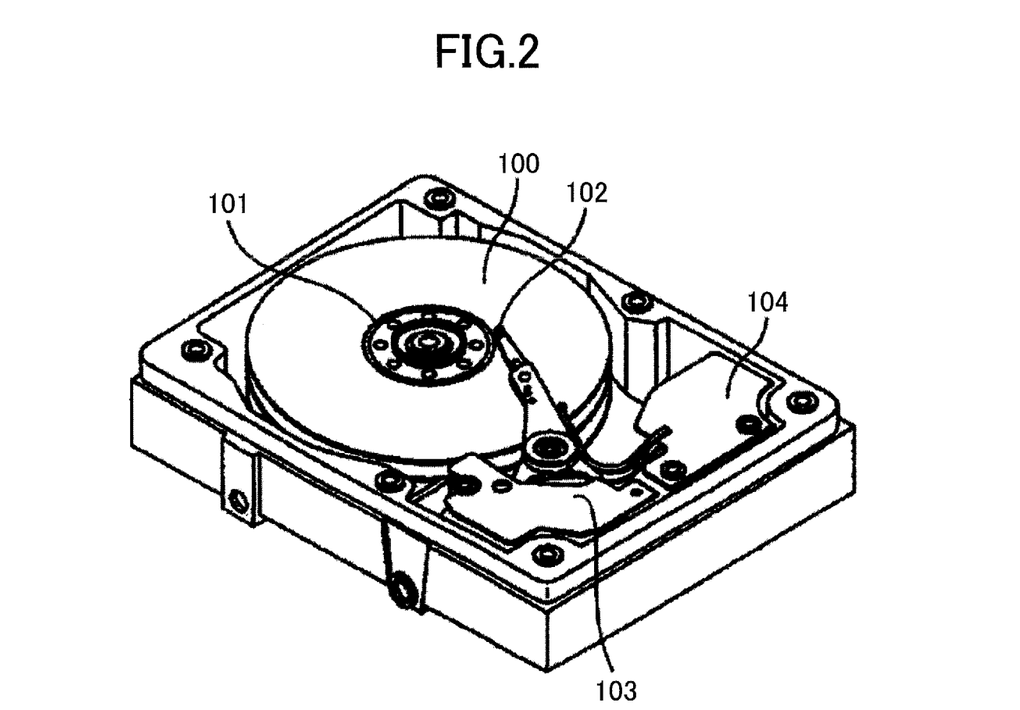
FIG. 2 is a perspective view illustrating an example of a structure of a magnetic storage apparatus according to one embodiment of the present invention.

FIG. 2 is a perspective view illustrating the example of the structure of the magnetic storage apparatus according to one embodiment of the present invention.

The magnetic storage apparatus illustrated in FIG. 2 includes a plurality of magnetic recording media 100, a driving mechanism 101 that drives the magnetic recording media 100 to rotate in the recording direction, a plurality of magnetic heads 102 employing the HAMR, a head moving mechanism 103 that moves the magnetic heads 102, and a signal processor 104 that are accommodated within a casing. In this example, the magnetic storage apparatus employs the HAMR. In addition, the plurality of magnetic recording media 100 are HAMR disks employing the HAMR. Hence, in this example, the driving mechanism 101 rotates the plurality of magnetic recording media 100, that is, the HAMR disks, in the recording direction. Of course, the magnetic storage apparatus may accommodate only one magnetic recording medium 100 inside the casing.

Figure 3:
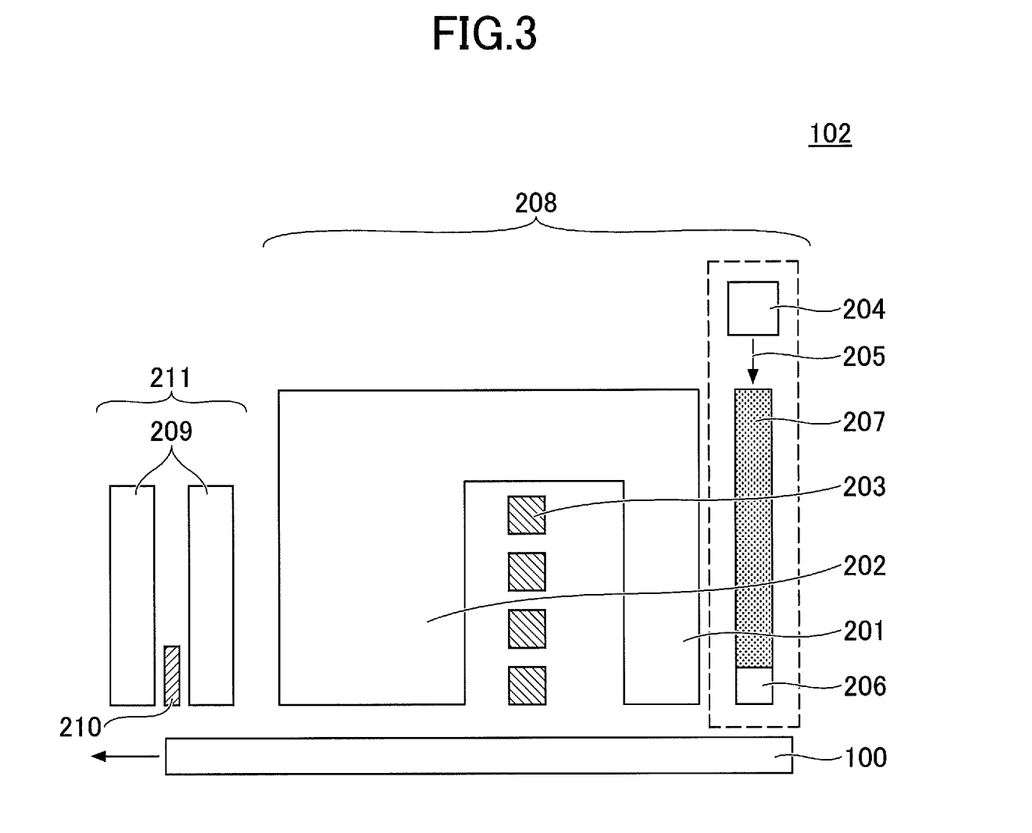
FIG. 3 is a diagram schematically illustrating a structure of a magnetic head of the magnetic storage apparatus illustrated in FIG. 2.

FIG. 3 is a diagram schematically illustrating a structure of the magnetic head used in the magnetic storage apparatus illustrated in FIG. 2. The magnetic head 102 includes a recording (or write) head 208 that records (or writes) signals to a corresponding one of the plurality of magnetic recording media 100, and a reproducing (or read) head 211 that reproduces (or reads) signals from the corresponding one of the plurality of magnetic recording media 100.

The recording head 208 includes a main magnetic pole 201, an auxiliary magnetic pole 202, a coil 203 that generates a magnetic field, a laser diode 204 that is an example of the laser generator and generates laser light 205, a near-field light generator (or near-field light generating element) 206 that generates near-field light for heating the magnetic recording medium 100, and a waveguide 207. The waveguide 207 guides the laser light 205 generated from the laser diode 204 to the near-field light generator 206 that is provided on a tip end of the magnetic head 102.

The reproducing head 211 includes a reproducing element 210, such as a TMR (Tunneling Magneto-Resistive) element or the like, for example, that is sandwiched between a pair of shields 209.

Of course, a magnetic head employing the microwave HAMR may be used in place of the magnetic head 102 employing the HAMR.

EXEMPLARY IMPLEMENTATIONS

Next, exemplary implementations according to the present invention, together with comparison examples, will be described. However, the present invention is not limited to these exemplary implementations, and various variations, modifications, and substitutions may be made without departing from the scope of the present invention.

Exemplary Implementation EI1

In one embodiment, the magnetic recording medium 100 illustrated in FIG. 1 in accordance with an exemplary implementation EI1 is manufactured by the following method. A Cr-50 at % Ti alloy layer (first underlayer) having a thickness of 100 nm, and a Co-27 at % Fe-5 at % Zr-5 at % B alloy layer (second underlayer) having a thickness of 30 nm are successively formed on a glass substrate, where at % represents atomic %. Then, after heating the glass substrate to a temperature of 250° C., a Cr layer (third underlayer) having a thickness of 10 nm, and a MgO layer (fourth underlayer) having a thickness of 5 nm are successively formed on the Co-27 at % Fe-5 at % Zr-5 at % B alloy layer (second underlayer). Next, after heating the glass substrate to a temperature of 450° C., a Fe-55 at % Pt alloy layer (first magnetic layer) having a thickness of 0.2 nm, a (Fe-49 at % Pt)-6.8 vol % C-20.8 vol % $SnO_2$-13.3 vol % BN alloy layer (second magnetic layer) having a thickness of 4.5 nm, and a carbon layer (protection layer) having a thickness of 3 nm are successively formed on the MgO layer (fourth underlayer), to form the magnetic recording medium, where vol % represents volume %. The first and second magnetic layers are examples of a plurality of laminated magnetic layers forming a magnetic recording layer of the magnetic recording medium.

Exemplary Implementations EI2-EI33 and Comparison Examples CE1-CE4

The magnetic recording media 100 in accordance with exemplary implementations EI2 to EI33 and comparison examples CE1 to CE4 are manufactured, similar to the magnetic recording medium 100 in accordance with the exemplary implementation EI1, except for the selected compositions of the second magnetic layer as illustrated in FIG. 4.

Next, a coercivity Hc, and an ordering degree S of the magnetic grains forming the second magnetic layer of magnetic recording media were evaluated for the exemplary implementations EI1 to EI33 and the comparison examples CE1 to CE4.

[Coercivity Hc]

A Kerr magnetometer, manufactured by Neoark Corporation, was used to measure the coercivity Hc of the magnetic recording media before forming the protection layer.

[Ordering Degree S]

The ordering degree S of the magnetic grains forming the second magnetic layer (Fe—Pt alloy grains having the $L1_0$ crystal structure), that is, the c-axis orientation with respect to the substrate, was evaluated. More particularly, a ratio (r) of an integrated intensity of a diffraction peak from the (001) texture forming a superlattice reflection, with respect to an integration intensity of a diffraction peak from the (002) texture, was obtained from an X-ray diffraction pattern of the second magnetic layer. Then, the ordering degree S was computed from the following formula, using a ratio (R=3.92) of the integrated intensity of the diffraction peak from the (001) texture forming the superlattice reflection, with respect to the integration intensity of the diffraction peak from the (002) texture of the perfectly ordered Fe—Pt alloy grains having the $L1_0$ crystal structure.

$$S=(r/R)^{1/2}$$

The higher the ordering degree S becomes, the higher the magnetic anisotropy constant Ku of the magnetic grains forming the second magnetic layer becomes.

FIG. 4 is a diagram illustrating evaluation results of the coercivity Hc, and the ordering degree S of the magnetic grains forming the second magnetic layer of magnetic recording media in accordance with the exemplary implementations EI1 to EI33 and the comparison examples CE1 to CE4.

From the evaluation results illustrated in FIG. 4, it may be confirmed that both the coercivity Hc, and the ordering degree S (or magnetic anisotropy constant Ku) of the magnetic grains forming the second magnetic layer of magnetic recording media in accordance with the exemplary implementations EI1 to EI33, are high.

However, because the grain boundary parts do not include the crystalline material in the second magnetic layer of the magnetic recording media in accordance with the comparison examples CE1, CE3, and CE4, both the coercivity Hc, and the ordering degree S (or magnetic anisotropy constant Ku) of the magnetic grains forming the second magnetic layer of magnetic recording media in accordance with the comparison examples CE1, CE3, and CE4, are low.

In addition, in the case of the magnetic recording medium in accordance with the comparison example CE2, the (001) textured orientation of $ZrO_2$ is such that the lattice constant of the axis perpendicularly oriented with respect to the substrate does not fall in the range of 0.30 nm to 0.36 nm, nor in the range of 0.60 nm to 0.72 nm. For this reason, both the coercivity Hc, and the ordering degree S (or magnetic anisotropy constant Ku) of the magnetic grains forming the second magnetic layer of magnetic recording medium in accordance with the comparison example CE2, are low.

Exemplary Implementations EI34-EI48

Figure 5:
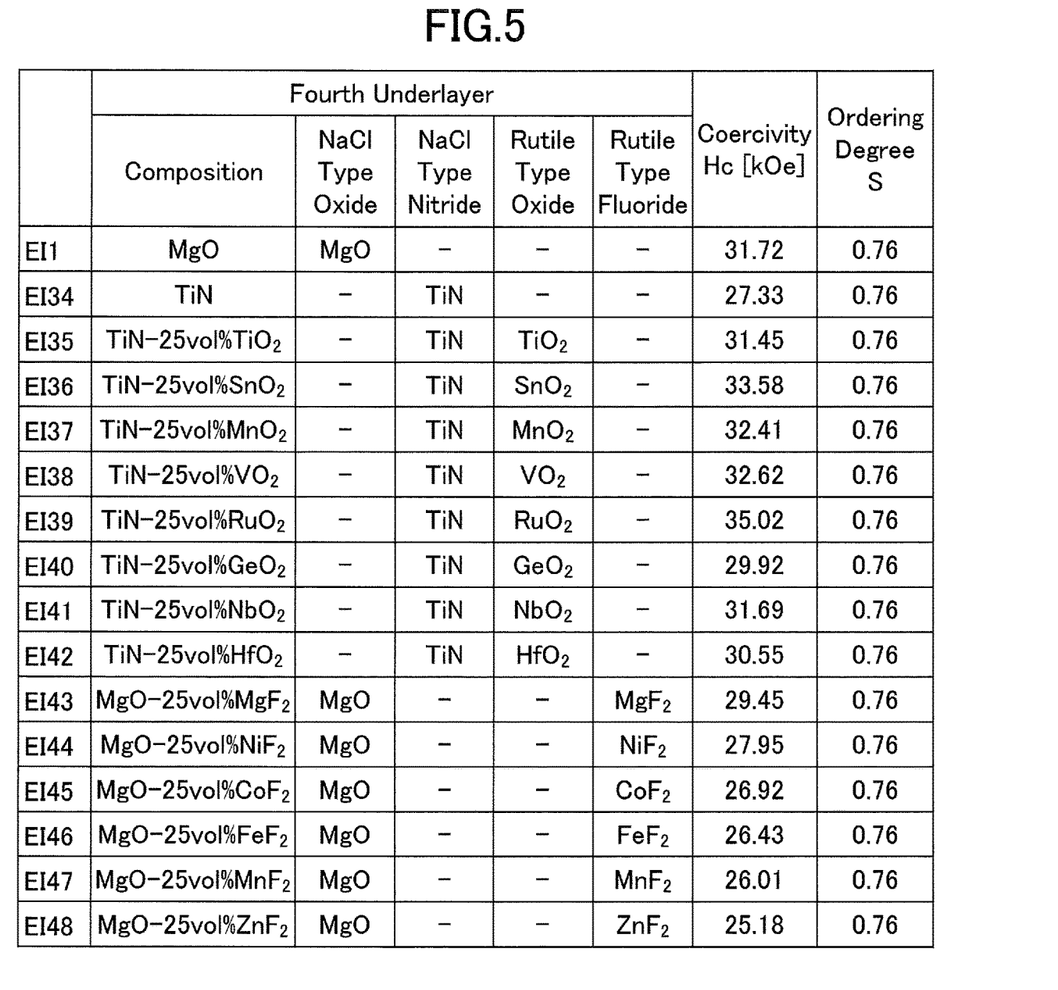
FIG. 5 is a diagram illustrating evaluation results of the coercivity Hc, and the ordering degree S of magnetic grains forming the second magnetic layer of magnetic recording media.

The magnetic recording media 100 in accordance with exemplary implementations EI34 to EI48 are manufactured, similar to the magnetic recording medium 100 in accordance with the exemplary implementation EI1, except for the selected compositions of the fourth underlayer as illustrated in FIG. 5.

FIG. 5 is a diagram illustrating evaluation results of the coercivity Hc, and the ordering degree S of the magnetic grains forming the second magnetic layer of magnetic recording media.

From the evaluation results illustrated in FIG. 5, it may be confirmed that both the coercivity Hc, and the ordering degree S (magnetic anisotropy constant Ku) of the magnetic grains forming the second magnetic layer of magnetic recording media in accordance with the exemplary implementations EI34 to EI48, are high.

Accordingly, embodiments and exemplary implementations of the present invention can provide a magnetic recording medium having a high coercivity, and form the magnetic layer of the magnetic recording medium by magnetic grains made of a high-Ku material, to achieve a high surface recording density.

Although the exemplary implementations are numbered with, for example, "EI1," "EI2," . . . , the ordinal numbers do not imply priorities of the exemplary implementations.

Further, the present invention is not limited to these embodiments and exemplary implementations, but various variations and modifications may be made without departing from the scope of the present invention.

What is claimed is:

1. A magnetic recording medium comprising:
   a substrate;
   an underlayer disposed above the substrate; and
   a magnetic layer disposed above the underlayer,
   wherein the magnetic layer has a granular structure including magnetic grains having a $L1_0$ crystal structure, and grain boundary parts having a volume fraction in a range of 25 volume % to 50 volume %,
   wherein the magnetic grains have a c-axis orientation with respect to the substrate, and
   wherein the grain boundary parts include a material having a lattice constant in a range of 0.30 nm to 0.36 nm, or in a range of 0.60 nm to 0.72 nm.

2. The magnetic recording medium as claimed in claim 1, wherein
   the material included in the grain boundary parts is a crystalline material that is perpendicularly oriented with respect to the substrate, and
   the lattice constant is that of an axis perpendicularly oriented with respect to the substrate.

3. The magnetic recording medium as claimed in claim 2, wherein the crystalline material is an ionic crystal selected from a group consisting of $SnO_2$, $OsO_2$, $IrO_2$, $VO_2$, $MnO_2$, $TiO_2$, $RuO_2$, $GeO_2$, $NbO_2$, $MgF_2$, $NiF_2$, $CoF_2$, $FeF_2$, $MnF_2$, $ZnF_2$, PbTe, SnTe, KCl, KBr, KI, InSb, and NaI.

4. The magnetic recording medium as claimed in claim 3, wherein the grain boundary parts further include C, BN, or B, and the ionic crystal has a volume fraction in a range of 10 volume % to 80 volume %.

5. The magnetic recording medium as claimed in claim 4, wherein
   the ionic crystals of $SnO_2$, $OsO_2$, $IrO_2$, $VO_2$, $MnO_2$, $TiO_2$, $RuO_2$, $GeO_2$, $NbO_2$, $MgF_2$, $NiF_2$, $CoF_2$, $FeF_2$, $MnF_2$, and $ZnF_2$ have a rutile structure in which a c-axis or a (110) axis is the axis perpendicularly oriented with respect to the substrate, and
   an a-axis of the ionic crystals of PbTe, SnTe, KCl, KBr, KI, InSb, and NaI is the axis perpendicularly oriented with respect to the substrate.

6. The magnetic recording medium as claimed in claim 3, wherein
   the ionic crystals of $SnO_2$, $OsO_2$, $IrO_2$, $VO_2$, $MnO_2$, $TiO_2$, $RuO_2$, $GeO_2$, $NbO_2$, $MgF_2$, $NiF_2$, $CoF_2$, $FeF_2$, $MnF_2$, and $ZnF_2$ have a rutile structure in which a c-axis or a (110) axis is the axis perpendicularly oriented with respect to the substrate, and
   an a-axis of the ionic crystals of PbTe, SnTe, KCl, KBr, KI, InSb, and NaI is the axis perpendicularly oriented with respect to the substrate.

7. The magnetic recording medium as claimed in claim 1, wherein
   the underlayer includes at least one compound selected from a group consisting of NaCl oxides, NaCl nitrides, and NaCl carbides,
   the NaCl oxides include at least one of MgO, TiO, and NiO,
   the NaCl nitrides include at least one of TiN, TaN, HfN, and NbN, and
   the NaCl carbides include at least one of ZrC, HfC, TaC, NbC, and TiC.

8. The magnetic recording medium as claimed in claim 7, wherein
   the underlayer further includes a rutile oxide or a rutile fluoride, and a c-axis or a (110) axis of the rutile oxide or the rutile fluoride is perpendicularly oriented with respect to the substrate.

9. The magnetic recording medium as claimed in claim 8, wherein the rutile fluoride includes one of $MgF_2$, $NiF_2$, $CoF_2$, $FeF_2$, $MnF_2$, $ZnF_2$, and $VF_2$.

10. The magnetic recording medium as claimed in claim 3, comprising:
    a plurality of laminated magnetic layers forming a magnetic recording layer,
    wherein a first magnetic layer, among the plurality of laminated magnetic layers, is made of an Fe—Pt alloy, and
    the magnetic layer is a second magnetic layer, among the plurality of laminated magnetic layers, formed on the first magnetic layer.

11. The magnetic recording medium as claimed in claim 10, wherein the underlayer includes
    a first underlayer, made of a Cr—Ti alloy, and formed on the substrate,
    a second underlayer, made of a Co—Fe—Zr—B alloy, and formed on the first underlayer,
    a third underlayer, made of Cr, and formed on the second underlayer, and
    a fourth underlayer, made of MgO, and formed on the third underlayer,
    wherein the first magnetic layer is formed on the fourth underlayer.

12. A magnetic storage apparatus comprising:
    the magnetic recording medium according to claim 1; and
    a magnetic head configured to write information to and read information from the magnetic recording medium.

13. A magnetic storage apparatus comprising:
    a magnetic recording medium;
    a magnetic head configured to write information to and read information from the magnetic recording medium; and
    a casing configured to accommodate the magnetic recording medium and the magnetic head,
    wherein the magnetic head includes a laser light generator configured to generate laser light, a waveguide configured to guide the laser light to a tip end of the magnetic head, and a near-field light generator configured to generate near-field light that heats the magnetic recording medium,
    wherein the magnetic recording medium includes a substrate, an underlayer, and a magnetic layer that are arranged in this order,
    wherein the magnetic layer has a granular structure including magnetic grains having a $L1_0$ crystal structure, and grain boundary parts having a volume fraction in a range of 25 volume % to 50 volume %,
    wherein the magnetic grains have a c-axis orientation with respect to the substrate, and
    wherein the grain boundary parts include a material having a lattice constant in a range of 0.30 nm to 0.36 nm, or in a range of 0.60 nm to 0.72 nm.

14. The magnetic storage apparatus as claimed in claim 13, wherein, in the magnetic recording medium,
    the material included in the grain boundary parts is a crystalline material that is perpendicularly oriented with respect to the substrate, and
    the lattice constant is that of an axis perpendicularly oriented with respect to the substrate.

15. The magnetic storage apparatus as claimed in claim 14, wherein the crystalline material is an ionic crystal selected from a group consisting of $SnO_2$, $OsO_2$, $IrO_2$, $VO_2$, $MnO_2$, $TiO_2$, $RuO_2$, $GeO_2$, $NbO_2$, $MgF_2$, $NiF_2$, $CoF_2$, $FeF_2$, $MnF_2$, $ZnF_2$, PbTe, SnTe, KCl, KBr, KI, InSb, and NaI.

16. The magnetic storage apparatus as claimed in claim 15, wherein the magnetic recording medium includes
    a plurality of laminated magnetic layers forming a magnetic recording layer,
    wherein a first magnetic layer, among the plurality of laminated magnetic layers, is made of an Fe—Pt alloy, and
    the magnetic layer is a second magnetic layer, among the plurality of laminated magnetic layers, formed on the first magnetic layer.

17. The magnetic storage apparatus as claimed in claim 16, wherein the underlayer of the magnetic recording medium includes
    a first underlayer, made of a Cr—Ti alloy, and formed on the substrate,
    a second underlayer, made of a Co—Fe—Zr—B alloy, and formed on the first underlayer,
    a third underlayer, made of Cr, and formed on the second underlayer, and
    a fourth underlayer, made of MgO, and formed on the third underlayer,
    wherein the first magnetic layer is formed on the fourth underlayer.

* * * * *